(12) United States Patent
Nakamura

(10) Patent No.: US 7,050,225 B2
(45) Date of Patent: May 23, 2006

(54) SUPERIMPOSING MICROSCOPE HAVING IMAGE PICKUP

(75) Inventor: Motokazu Nakamura, Hino (JP)

(73) Assignee: Olympus Corporation, (JP)

( * ) Notice: Subject to any disclaimer, the term of this patent is extended or adjusted under 35 U.S.C. 154(b) by 59 days.

(21) Appl. No.: 10/213,744

(22) Filed: Aug. 6, 2002

(65) Prior Publication Data

US 2003/0030899 A1   Feb. 13, 2003

(30) Foreign Application Priority Data

Aug. 7, 2001   (JP)  ............................. 2001-239357

(51) Int. Cl.
*G02B 21/00*   (2006.01)
(52) U.S. Cl. ...................... 359/368; 359/369; 359/376
(58) Field of Classification Search ................ 359/385, 359/388, 368, 369; 250/208.1
See application file for complete search history.

(56) References Cited

U.S. PATENT DOCUMENTS

| | | | |
|---|---|---|---|
| 4,567,478 A * | 1/1986 | Schwab ........................ 345/9 |
| 4,786,154 A * | 11/1988 | Fantone et al. ............. 359/369 |
| 5,095,887 A * | 3/1992 | Leon et al. ................. 600/166 |
| 5,742,429 A * | 4/1998 | Tsumanuma et al. ....... 359/377 |
| 6,081,371 A * | 6/2000 | Shioda et al. ............... 359/372 |
| 6,088,154 A * | 7/2000 | Morita ....................... 359/375 |
| 6,333,813 B1 * | 12/2001 | Morita et al. ............... 359/368 |
| 6,337,474 B1 * | 1/2002 | Morizono ................ 250/208.1 |
| 6,583,928 B1 * | 6/2003 | Ooki et al. ................. 359/388 |

* cited by examiner

*Primary Examiner*—Drew A. Dunn
*Assistant Examiner*—Mark Consilvio
(74) *Attorney, Agent, or Firm*—Ostrolenk, Faber, Gerb & Soffen, LLP

(57) ABSTRACT

A first image-forming optical system that receives a beam of light from an objective forms a first image forming point. The first image-forming optical system forms the beam of light into a first optical image at the first image-forming point and relays the first optical image. A second image-forming optical system is provided to form an image of a monitor near the first image-forming point, and the image is relayed by the first image-forming optical system. A third image-forming optical system is arranged in the first image-forming optical system to form a second image-forming point. The third image-forming optical system forms a second optical images at the second image-forming point and guide the optical image to an eyepiece lens.

26 Claims, 8 Drawing Sheets

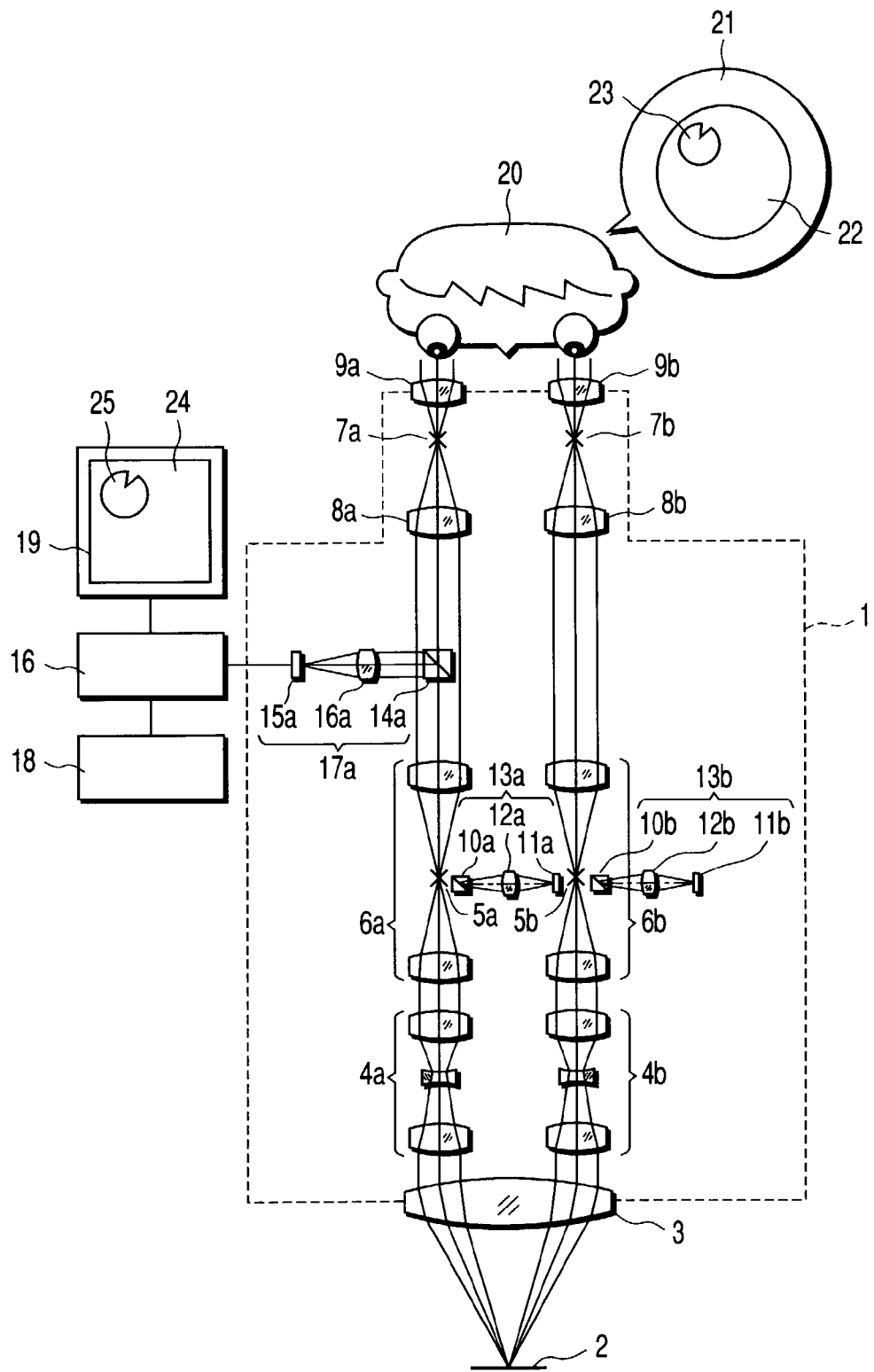
F I G. 1

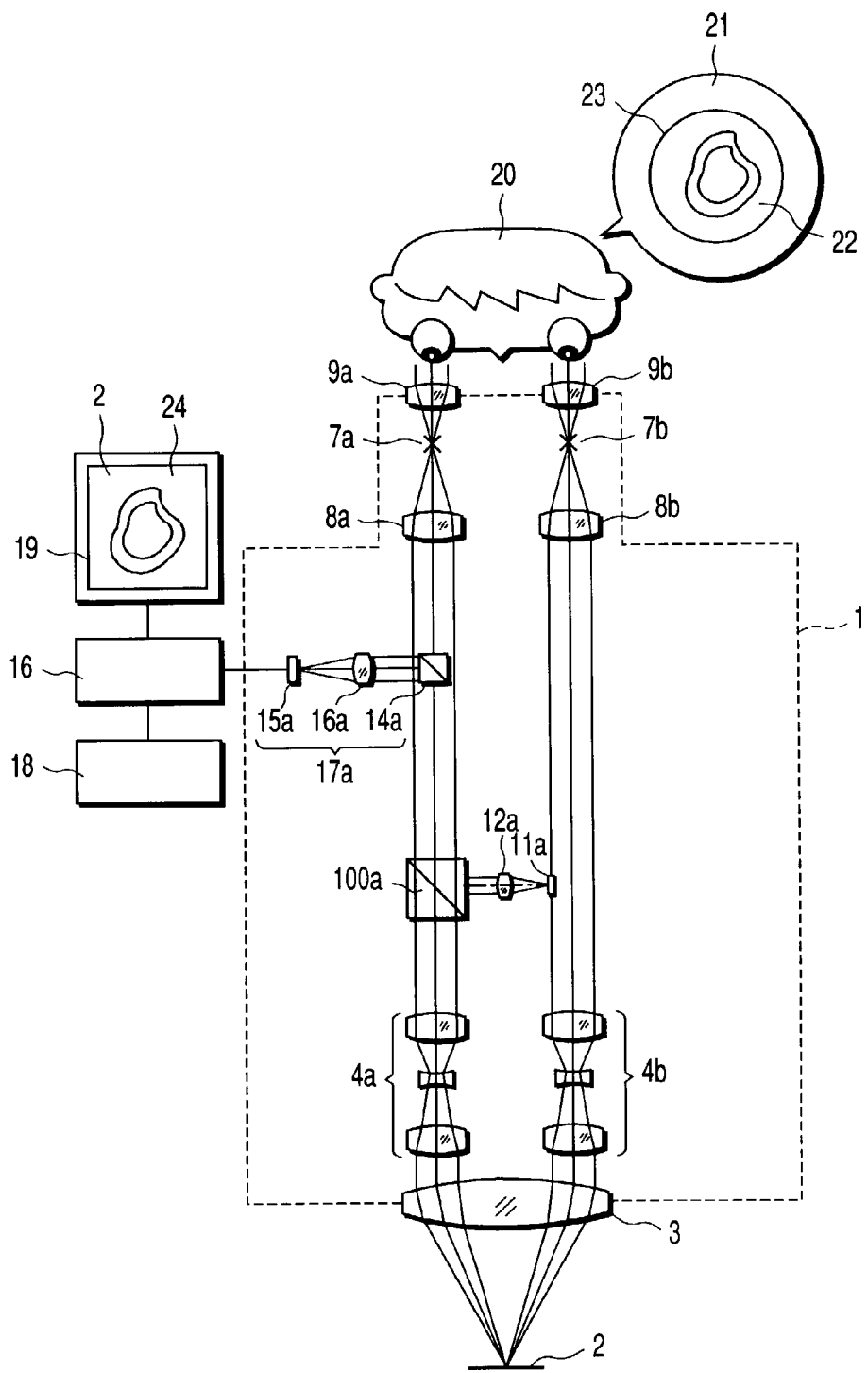
F I G. 11

SUPERIMPOSING MICROSCOPE HAVING IMAGE PICKUP

CROSS-REFERENCE TO RELATED APPLICATIONS

This application is based upon and claims the benefit of priority from the prior Japanese Patent Application No. 2001-239357, filed Aug. 7, 2001, the entire contents of which are incorporated herein by reference.

BACKGROUND OF THE INVENTION

1. Field of the Invention

The present invention relates to a microscope apparatus including a projection means for projecting an image within the view of a microscope from an image display means.

2. Description of the Related Art

In microsurgery, it is demanded that an image of the affected area of a patient during surgery should be recorded on a VTR or the like in order to confirm the affected area after his or her operation, explain the operation to the patient, etc. Such a technique is disclosed in, e.g., U.S. Pat. No. 5,835,266. This patent discloses picking up an image of a surgical microscope by splitting part of pencils of light of the surgical microscope by a light pencil splitting means and then guiding the split light pencil to an image pickup means.

Microsurgery has recently been performed using a microscope and an endoscope together. In this surgery, it is demanded that an operator should observe both a microscopic image and an endoscopic image at the same time without taking his or her eyes off the eyepieces of the microscope and endoscope. Such a technique is disclosed in U.S. Pat. Nos. 6,088,154 and 6,266,182. These Patents disclose that a projection means for guiding an image from an image display means is provided close to a position to form a final image of a microscopic optical system.

In a microsurgery using both a surgical microscope and an endoscope, an operator has to pick up an image of each of these two observation apparatuses.

To record both a microscopic image and an endoscopic image on a VTR in the apparatuses disclosed in U.S. Pat. Nos. 6,088,154 and 6,266,182, a light pencil splitting means is added to a final image-forming point to split part of pencils of light, as disclosed in U.S. Pat. No. 5,835,266. The light pencil split by the light pencil splitting means is recorded on the VTR as a microscopic image. On the other hand, part of an endoscopic image guided to the neighborhood of the final image-forming point is (electrically) split and the split image is recorded on another VTR as an endoscopic image.

As recording of surgery, it is necessary to know what operation an operator is performing under a surgery microscope and what blind spot the operator is observing through an endoscope. In other words, it is desirable that there be a correlation in time between the recorded microscopic and endoscopic images.

In order to achieve the above correlation with the apparatuses disclosed in U.S. Pat. Nos. 6,088,154 and 6,266,182, an operator has to start the recording of a microscopic image and that of an endoscopic image simultaneously and find a correlation in time between them while seeing a counter after the operation. However, this method has a problem that not only a plurality of recording and reproduction devices are required but also a procedure for seeing an image in itself is very complicated.

BRIEF SUMMARY OF THE INVENTION

A microscope apparatus according to a first aspect of the present invention comprises an objective, a first image-forming optical system arranged to receive a beam of light from the objective, the first image-forming optical system forming a first image-forming point, and the first image-forming optical system forming the beam of light into a first optical image at the first image-forming point and relaying the first optical image, a monitor which displays an image, a second image-forming optical system arranged to receive the image and form the image into a second optical image near the first image-forming point, the second optical image being relayed by the first image-forming optical system, a third image-forming optical system arranged on an optical path of the first image-forming optical system to receive the first optical image and the second optical image relayed by the first image-forming optical system, the third image-forming optical system forming a second image-forming point, and the third image-forming optical system forming the first optical image and the second optical image into an image at the second image-forming point and guiding the image to an eyepiece lens, a beam splitter arranged between the first image-forming point and the second image-forming point to split the first optical image and the second optical image relayed by the first image-forming optical system from the optical path of the first image-forming optical system, a fourth image-forming optical system arranged on an optical path of the first optical image and the second optical image split by the beam splitter, the fourth image-forming optical system forming the first optical image and the second optical image into an image, and an image pickup element arranged on the optical path of the first optical image and the second optical image split by the beam splitter, the image pickup element picking up the first optical image and the second optical image.

A microscope apparatus according to a second aspect of the present invention comprises an objective, a first image-forming optical system arranged to receive a beam of light from the objective, the first image-forming optical system forming a first image-forming point, and the first image-forming optical system forming the beam of light into a first optical image at the first image-forming point and relaying the first optical image, a monitor which displays an image, a second image-forming optical system arranged to receive the image and form the image into a second optical image on a plane which is perpendicular to an optical axis of the first image-forming point and includes the first image-forming point, the second optical image being relayed by the first image-forming optical system, a third image-forming optical system arranged on an optical path of the first image-forming optical system to receive the first optical image and the second optical image relayed by the first image-forming optical system, the third image-forming optical system forming a second image-forming point, and the third image-forming optical system forming the first optical image and the second optical image into an image at the second image-forming point and guiding the image to an eyepiece lens, a beam splitter arranged between the first image-forming point and the second image-forming point to split the first optical image and the second optical image relayed by the first image-forming optical system from the optical path of the first image-forming optical system, a fourth image-forming optical system arranged on an optical path of the first optical image and the second optical image split by the beam splitter, the fourth image-forming optical system forming the first optical image and the second optical image into an image, and an image pickup element arranged on the optical path of the first optical image and the second optical image split by the beam splitter, the image pickup element picking up the first optical image and the second optical image.

A microscope apparatus according to a third aspect of the present invention comprises an observation optical system which receives light from an objective, forms the light into an optical image at each of a first image-forming point and a second image-forming point, and transmits the optical image to an eyepiece optical system from the second image-forming point, display means for displaying an image, optical image superposing means for optically superposing the image displayed on the display means on the optical image near the first image-forming point of the observation optical system, optical image splitting means for optically splitting an optical image transmitted through an optical path between the first image-forming point and the second image-forming point, and image pickup means for picking up the optical image split by the optical image splitting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram of the configuration of a mirror unit of a surgical microscope according to a first embodiment of the present invention.

FIG. 11 is a diagram of the configuration of a mirror unit of a surgical microscope according to a sixth embodiment of the present invention.

DETAILED DESCRIPTION OF THE INVENTION

Figure 2:
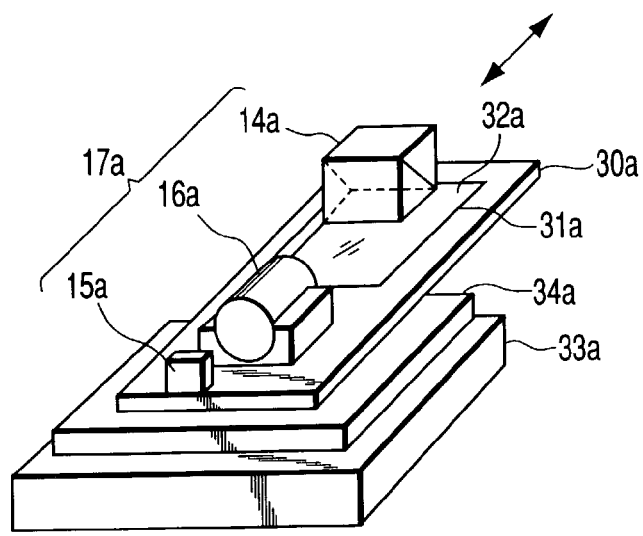
FIG. 2 is a perspective view of an image pickup lens group and its peripheral portion of a mirror unit according to a second embodiment of the present invention.

Embodiments of the present invention will now be described with reference to the accompanying drawings.

FIG. 1 is a diagram of the configuration of a mirror unit of a surgical microscope according to a first embodiment of the present invention. The mirror unit 1 is attached to a base arm (not shown) that can freely be arranged three-dimensionally. The mirror unit 1 includes an objective 3 that receives pencils of light from the affected part 2 as an object to be observed. The mirror unit 1 also includes a pair of right and left scaling optical systems 4a and 4b for scaling an image upon receipt of pencils of light from the objective 3, first image-forming optical systems 6a and 6b for relaying the pencils of light from the scaling optical systems 4a and 4b while forming them into images at first image points 5a and 5b, third image-forming optical systems 8a and 8b for forming the pencils of light from the first image-forming optical systems 6a and 6b into images at second image points 7a and 7b, and eyepieces 9a and 9b for enlarging the images formed at the second image points 7a and 7b such that they can be observed.

Prisms 10a and 10b are provided close to their respective first image points 5a and 5b such that their top surfaces are almost flush with the points 5a and 5b. Small-sized LCD monitors 11a and 11b are arranged on their respective optical paths of the prisms 10a and 10b as image display means for displaying an endoscopic image or the like as an electronic image under the control of a controller (not shown). Second image-forming optical systems 12a and 12b are arranged on their respective outgoing optical axes of the LCD monitors 11a and 11b. The second image-forming optical systems 12a and 12b are fixedly arranged such that they form images of the LCD monitors 11a and 11b on the top surfaces of the prisms 10a and 10b, respectively. The LCD monitors 11a, 11b, second image-forming optical systems 12a and 12b, and prisms 10a and 10b constitute display lens groups 13a and 13b, respectively.

A beam splitter or split mirror 14a is provided between the first and second image points 5a and 7a on the right-eye side of an operator to serve as an optically image splitting means for splitting pencils of light between the third image-forming optical system 8a and a CCD 15a. The CCD 15a serves as an image pickup element for converting an optical image of the beam splitter 14a into an electrical signal. An image-forming lens 16a serving as an image pickup optical system is arranged on the optical axis of the beam splitter 14a. The image-forming lens 16a forms the pencils of light from the beam splitter 14a into an image on the CCD 15a. The CCD 15a, image-forming lens 16a and beam splitter 14a constitute an image pickup lens group 17a. The CCD 15a is connected to a camera control unit (referred to as CCU hereinafter) for restoring the electrical signal to a video signal. The CCU 16 is connected to both a VTR 18 and a monitor 19.

In FIG. 1, reference numeral 20 indicates an operator, 21 shows an observation image of the operator, 22 denotes an affected-part image in the observation image, 23 represents an LCD monitor image in the observation image, 24 indicates an affected-part image in the monitor image, and 25 denotes an LCD monitor image in the monitor image.

An operation of the mirror unit 1 according to the first embodiment will now be described.

The operator 20 operates the base arm to fix the mirror unit 1 in a desired position. The light emitted from the affected part 2 enters the scaling optical systems 4a and 4b through the objective 3 of the mirror unit 1. The light is scaled to an arbitrary magnification by the scaling optical systems 4a and 4b. The first image-forming optical systems 6a and 6b form the light into images of the part 2 at the first image points 5a and 5b.

If an image of an endoscope or the like is displayed on the LCD monitors 11a and 11b through a control unit, it is formed on the top surfaces of the prisms 10a and 10b by the second image-forming optical systems 12a and 12b. Thus, the images on the first image points 5a and 5b each correspond to superposition of the endoscopic image and the affected-part image.

As described above, the pencils of light emitted from the first image-forming optical systems 6a and 6b each correspond to superposition of the endoscopic image with the affected-part image. The beam of light on the right-eye side of the operator is guided to the beam splitter 14a and split between the image pickup lens group 17a and the third image-forming optical system 8a. The beam of light on the image pickup lens group 17a is formed into an image on the CCD 15a by the image-forming lens 16a. This image is converted into an electrical signal and transmitted to the CCU 16. The CCU 16 restores the electrical signal to a video signal and, as shown in FIG. 1, a superposed image of the affected-part image 24 and LCD monitor image 25 is displayed on the monitor 19. The same image is recorded on the VTR 18.

The beam of light split into the other side by the beam splitter 14a and the beam of light emitted from the first image-forming optical system 6b on the left-eye side of the operator 20 are guided to the third image-forming optical systems 8a and 8b, respectively and formed into images on the second image points 7a and 7b, respectively. These images are also superposition of the affected-part image and the LCD monitor image. The operator 20 enlarges the images of the second image points 7a and 7b through the eyepieces 9a and 9b and observes a superposed image of the affected-part image 22 and the LCD monitor image 23 as shown in the observation image 21 of the operator.

In the first embodiment, the image pickup lens group 17a is provided on the right-eye side of the operator 20; however, it can be done on the left-eye side thereof. Furthermore, it is needless to say that the image pickup lens group 17a can be provided on both the right- and left-eye sides and so can be the CCU 16 to display and record their pictures time-divisionally and thus observe and record 3-D images of the pictures.

According to the first embodiment, the first image-forming optical systems 6a and 6b, second image-forming optical systems 12a and 12b and third image-forming optical systems 8a and 8b are arranged on the objective side. The following advantage is therefore obtained. The eyepieces are not increased in size because no image pickup means is interposed between the second image-forming point 7a and the operator.

FIG. 2 is an enlarged perspective view of the image pickup lens group 17a and its peripheral portion of a mirror unit according to a second embodiment of the present invention. The second embodiment differs from the first embodiment only in that the image pickup lens group 17a can be moved. Except for this difference, the second embodiment is the same as the first embodiment and thus the descriptions of the same are omitted.

An opening 31a is formed in a support plate 30a and a transparent plate 32a is fixed in the opening 31a. The foregoing CCD 15a, image-forming lens 16a and beam splitter 14a are fixed on the support plate 30a to constitute the image pickup lens group 17a. The beam splitter 14a is fixed on the transparent plate 32a.

A slide table 33a is provided and includes a motor, a rack and a pinion gear, none of which are shown. A table unit 34a is supported by the slide table 33a such that it can be moved in the double-headed arrow in FIG. 2 under the control of the controller. The support plate 30a is fixed on the table unit 34a.

An operation of the image pickup lens group 17a according to the second embodiment will now be described.

When an operator needs to pick up an image (display an image on a monitor or record it on a VTR) using an image pickup optical system during observation, he or she operates the controller to move the table unit 34a to a position in which the beam splitter 14a can capture a beam of light. On the other hand, the operator need not pick up an image using the image pickup optical system, he or she operates the controller to cause the table unit 34a to retreat to a position in which the beam splitter 14a does not cut off a beam of light. Thus, the beam splitter 14a does not split the beam of light and 100 percent of light is transmitted to the observer side, with the result that the operator can operate under good visibility.

Consequently, the second embodiment has the following advantage in addition to that of the first embodiment. Since the position of the image pickup means can be varied according to whether an image needs to be picked up or not, a beam of light can be used without waste to observe and pick up an image.

FIGS. 3 to 6 illustrate a mirror unit of a surgical microscope according to a third embodiment of the present invention. Though the mirror unit of the first embodiment includes a pair of scaling optical systems, that of the third embodiment includes a single large scaling optical system. The mirror unit can be rotated around the optical axis between the scaling optical system and the first image-forming optical systems (between the mirror unit and eyepieces). Moreover, mirror unit can be inclined between the mirror unit and eyepieces and a pupil distance can be adjusted in the eyepieces. The same components as those of the first embodiment are indicated by the same reference numerals and their descriptions are omitted.

Figure 3:
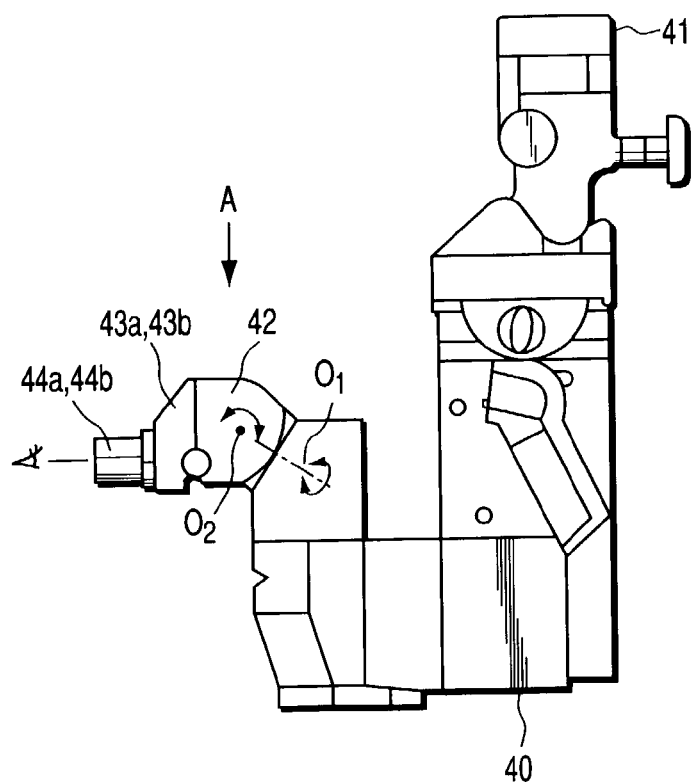
FIG. 3 is a diagram of the whole configuration of a mirror unit of a surgical microscope according to a third embodiment of the present invention.

FIG. 3 is a diagram of the whole configuration of the mirror unit of the surgical microscope according to the third embodiment. The mirror unit 40 includes an observation optical system. A distal end 41 of the mirror unit 40 is attached to a base arm. The mirror unit 40 can freely be fixed three-dimensionally. The mirror unit 40 also includes an eyepiece barrel 42 having a pair of right and left optical systems for receiving pencils of light from the mirror unit 40. The eyepiece barrel 42 includes a pair of right and left pupil distance adjusting housings 43a and 43b each having a mirror (described later). A pair of right and left eyepiece housings 44a and 44b including an eyepiece optical system (described later) is attached to the pupil distance adjusting housings 43a and 43b on the operator side.

Figure 4:
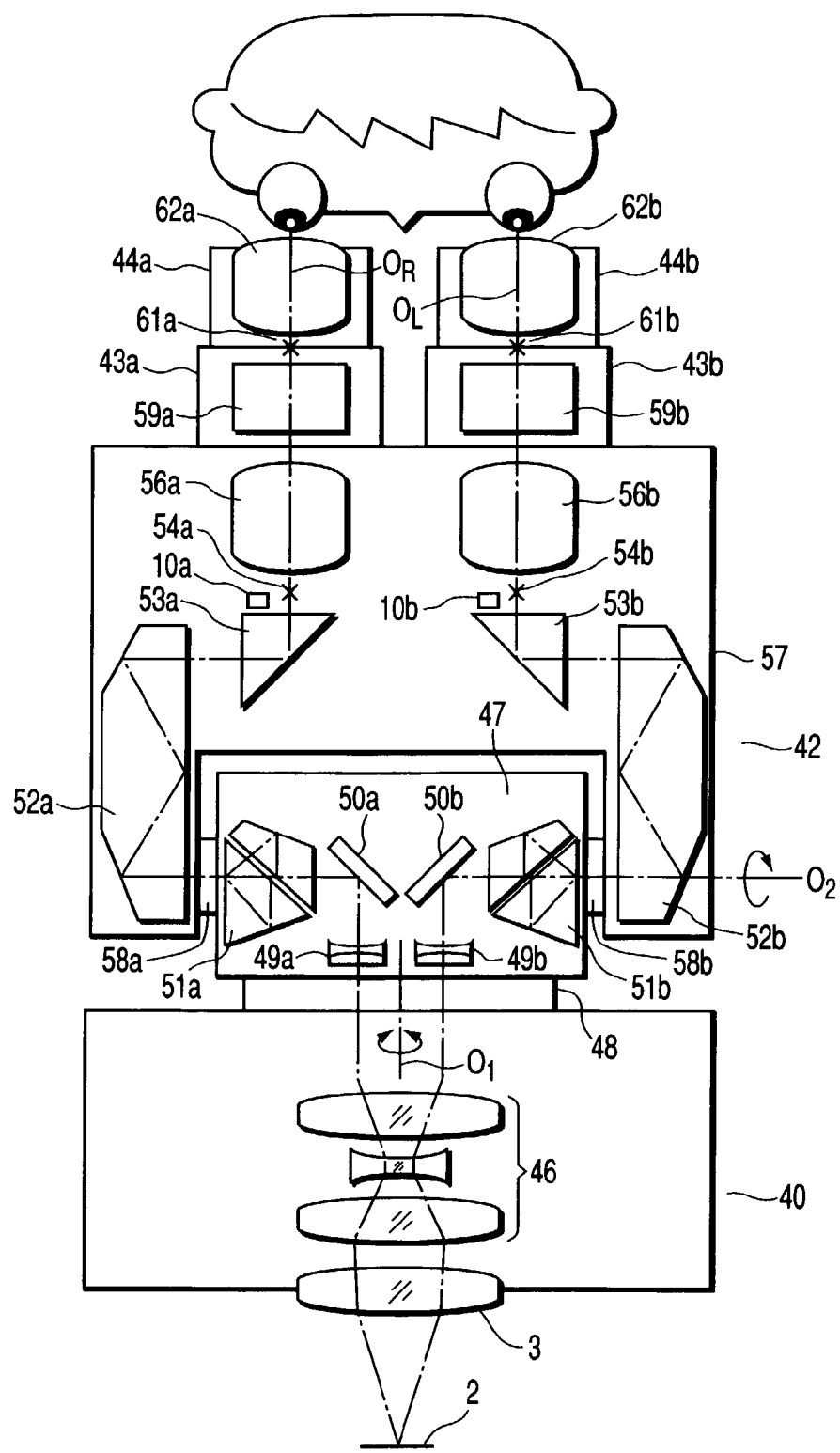
FIG. 4 is a diagram of the configuration of the mirror unit viewed from arrow A in FIG. 3.
Figure 5:
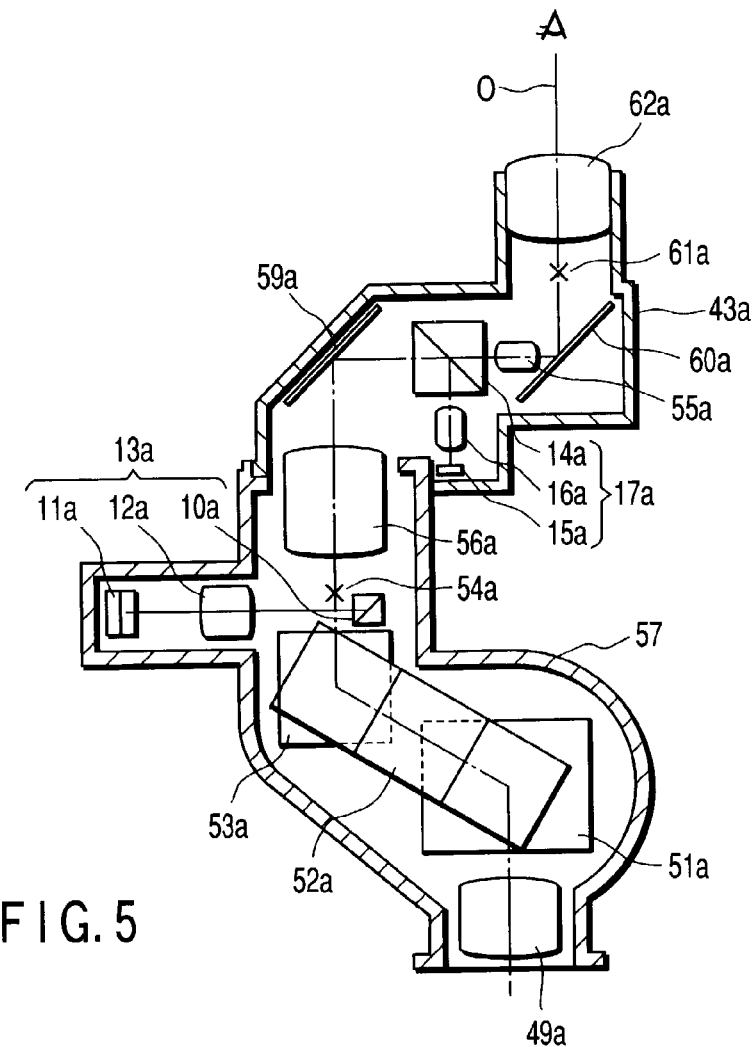
FIG. 5 is a side view of an eyepiece barrel of the mirror unit according to the third embodiment of the present invention.

The configuration of the optical system of the mirror unit 40 will now be described with reference to FIGS. 4 and 5. FIG. 4 is a diagram viewed from arrow A in FIG. 3 and showing the internal structure of the optical system. FIG. 5 is a side view of the eyepiece barrel 42, showing the right-side observation optical system of FIG. 4.

Referring to FIG. 4, the mirror unit 40 includes an objective 3 for receiving a beam of light from the affected part 2 and a scaling optical system 46 for receiving the beam of light from the objective 3 and scaling an image of the beam of light.

A first movable housing 47 is connected to the mirror unit 40 through a connector 48. The housing 47 can freely rotate around the axis $O_1$ of the mirror unit 40. The movable housing 47 includes a pair of right and left first image-forming optical systems 49a and 49b. The first image-forming optical systems 49a and 49b are optically connected to the observation optical system of the mirror unit 40 to receive right and left pencils of light from the mirror unit 40. The axis $O_1$ is one that almost coincides with the center axis of the objective 3 and scaling optical system 46.

The scaling optical system 46 is large enough to keep optical coupling even though the first image-forming optical systems 49a and 49b rotate around the axis $O_1$.

Mirrors 50a and 50b each for reflecting a beam of light 90° outwardly are arranged on their respective optical paths of the first image-forming optical systems 49a and 49b. Image rotator prisms 51a and 51b are arranged on their respective outgoing optical axes of the mirrors 50a and 50b.

Prisms 52a and 52b each for reversing a beam of light for observation 180° are arranged behind the image rotator prisms 51a and 51b, respectively. Triangular prisms 53a and 53b are fixedly arranged behind the prisms 52a and 52b, respectively to reflect the outgoing light beams of the prisms 52a and 52b in directions parallel to observation optical axes OL and OR of eyepiece optical systems that will be described later. First image points 54a and 54b at which the first image-forming optical systems 49a and 49b form images are located behind the triangular prisms 53a and 53b, respectively. Relay lenses 56a and 56b for relaying the formed images as parallel light pencils are provided behind the first image points 54a and 54b, respectively. The prisms 52a and 52b, triangular prisms 53a and 53b and relay lenses 56a and 56b are included in a second movable housing 57.

The second movable housing 57 can be rotated around an axis $O_2$, namely, the incoming optical axis of the prisms 52a and 52b by means of connectors 58a and 58b. A cum mechanism (not shown) or the like allows the rotator prisms 51a and 51b to rotate around the axis $O_2$ by half the rotation of the second movable housing 57 with respect to the first movable housing 47. It is thus possible to prevent an image from rotating in each of the eyepiece optical systems 62a and 62b when the second movable housing 57 rotates with respect to the first movable housing 47.

The pupil distance adjusting housings 43a and 43b include mirrors 59a and 59b and mirrors 60a and 60b, respectively. These mirrors serve as reflection members. A relay lens 55a is interposed between the mirrors 59a and 60a (see FIG. 5) and a relay lens 55b is interposed between the mirrors 59b and 60b. The relay lenses 55a and 55b serve as third image-forming optical systems for imaging parallel light pencils at second image points 61a and 61b, respectively.

The finally formed images are guided to the eyepiece optical systems 62a and 62b, included in the eyepiece housings 44a and 44b, to serve as microscopic optical observation images having observation optical axes OR and OL, respectively.

Each of the pupil distance adjusting housings 43a and 43b can freely rotate around an axis that is almost equal to its corresponding one of the outgoing optical axes (in the length direction of FIG. 4) of the triangular prisms 53a and 53b with respect to a second movable housing 57. The housings 43a and 43b are firmly fixed in the axial direction by detachment-prevention members (not shown). The housings 43a and 43b and the mirrors 59a and 60a that are arranged in parallel to each other constitute a so-called siedentops pupil distance adjusting mechanism.

As illustrated in FIG. 5, the prism 10a is provided close to the first image-forming point 54a such that its top surface is almost flush with the point 54a. The prism 10a, LCD monitor 11a and second image-forming optical system 12a constitute a projection lens group 13a. Though not shown, the same projection lens group is provided on the left side of the eyepiece barrel 42.

Only on the right-eye side, a beam splitter 14a is provided in a parallel pencil light section between the mirror 59a and relay lens 55a, and the beam splitter 14a, and CCD 15a and image-forming lens 16a constitute an image pickup lens group 17a.

An operation of the surgical microscope according to the third embodiment of the present invention will now be described.

An operator operates a base arm to fix the mirror unit 40 in which position he or she can observe the affected part 2. If the mirror unit 40 tilts, the first movable housing 47 of the eyepiece barrel 42 is rotated around the axis $O_1$ with respect to the mirror unit 40 and located in which position the operator can easily observe the part 2. Since the scaling optical system 46 is large enough to deal with the rotation of the first image-forming optical systems 49a and 49b, the rotation does not shield a beam of light. Then, the second movable housing 57 is rotated around the axis $O_2$ with respect to the first movable housing 47 and the eyepiece optical systems 62a and 82b are located in the positions of the operator's eyes.

The image rotator prisms 51a and 51b in the first movable housing 47 of the eyepiece barrel 42 rotate around the axis $O_2$ by half the rotation of the second movable housing 57.

The light emitted from the affected part 2 enters the scaling optical system 46 through the objective 3 in the mirror unit 40. The light is scaled to an arbitrary magnification and enters the first image-forming optical systems 49a and 49b.

The right and left pencils of light pass through the image rotary prisms 51a and 51b and their image rotations are corrected by the rotation of the second movable housing 57 around the axis $O_2$. After that, the light pencils are reflected by the prisms 52a and 52b and triangular prisms 53a and 53b and formed into images at the first image points 54a and 54b. The images are restored to parallel light pencils by the relay lenses 56a and 56b. The parallel light pencils are reflected by the mirrors 59a and 59b and mirrors 60a and 80b and formed again into images at the second image points 61a and 61b. Then, the images are guided to the eyepiece optical systems 62a and 62b and observed three-dimensionally at a desired magnification by the operator.

Figure 6:
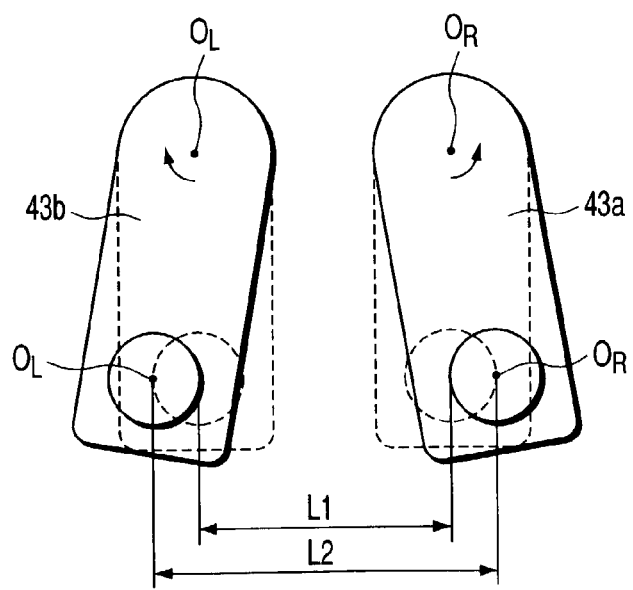
FIG. 6 is a diagram showing two different distances between the observation optical axes in the mirror unit according to the third embodiment of the present invention.

If a distance between the observation optical axes OR and OL differs from the operator's pupil distance to disable the operator from observing the images three-dimensionally, the pupil distance adjusting housings 43a and 43b are rotated to perform a so-called pupil distance adjustment for conforming the observation optical axes OR and OL to the operator's pupil distance. In FIG. 6, the distance between the observation axes OR and OL is increased from L1 to L2.

On the other hand, the operator operates a control unit (not shown) to display a desired image on the LCD monitor 11a together with an endoscopic observation image and a microscopic image such as CT and MR images. Then, the light emitted from the LCD monitor 11a is formed into an image on the top surface of the prism 10a by the second image-forming optical system 12a. The top surface of the prism 10a is located close to the first image-forming point 54a. The endoscopic observation image is superposed on the microscopic image and the superposed image is displayed on the top surface of the prism 10a.

The parallel light pencils incident on the beam splitter 14a are split between the image pickup lens group 17a and the mirror 60a. The light pencil on the image pickup lens group 17a is formed into an image on the CCD 15a by the image-forming lens 16a.

The image formed on the CCD 15a is converted into an electrical signal. The electrical signal is transmitted to the CCU and restored to a video signal. The video signal is displayed on a monitor (not shown) or recorded on a VTR (not shown).

Consequently, the third embodiment has the following advantage in addition to that of the first embodiment. An operator can easily observe the affected part since he or she can freely move the eyepiece barrel in relative to the mirror unit.

Figure 7:
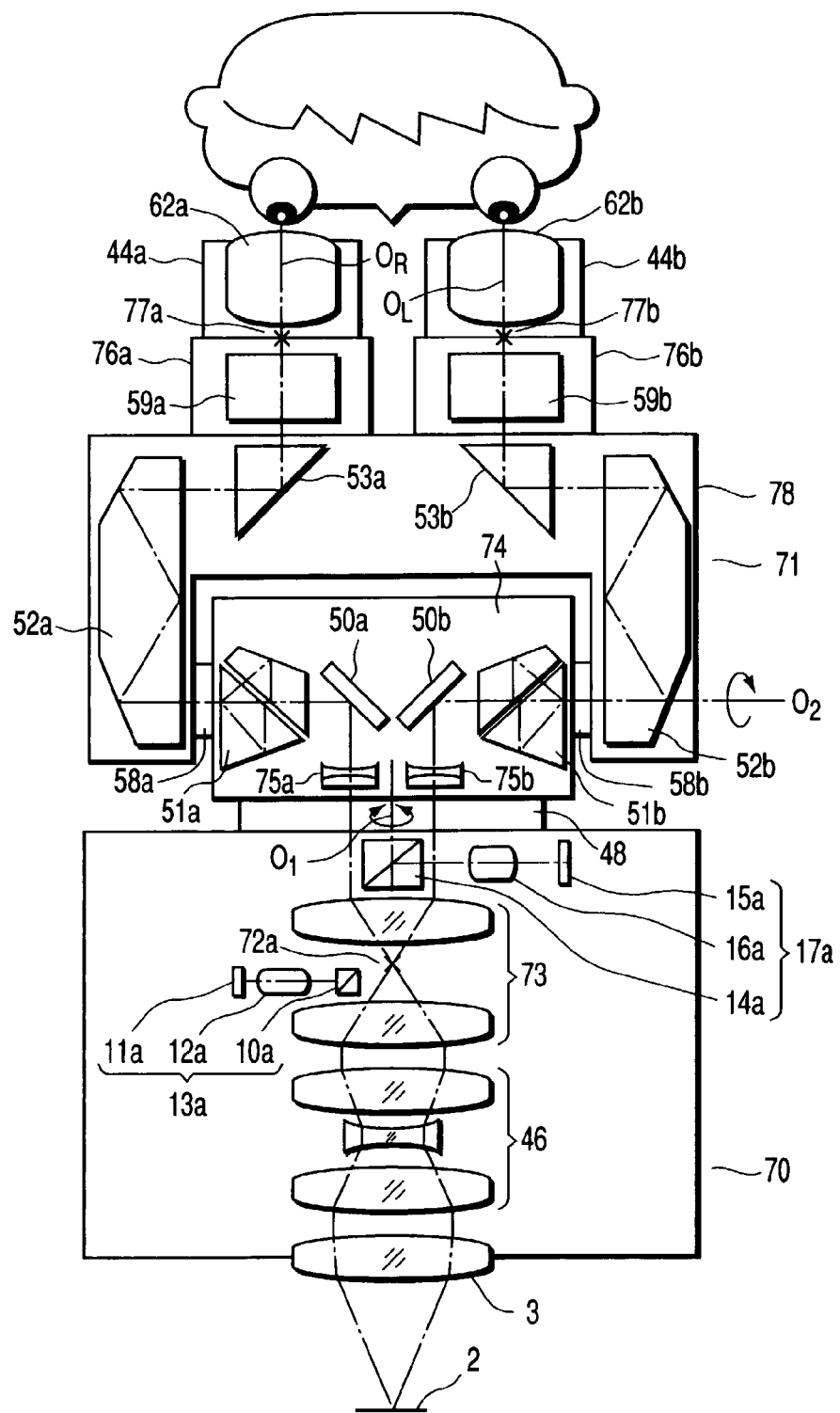
FIG. 7 is a diagram of the configuration of a mirror unit of a surgical microscope according to a fourth embodiment of the present invention.
Figure 8:
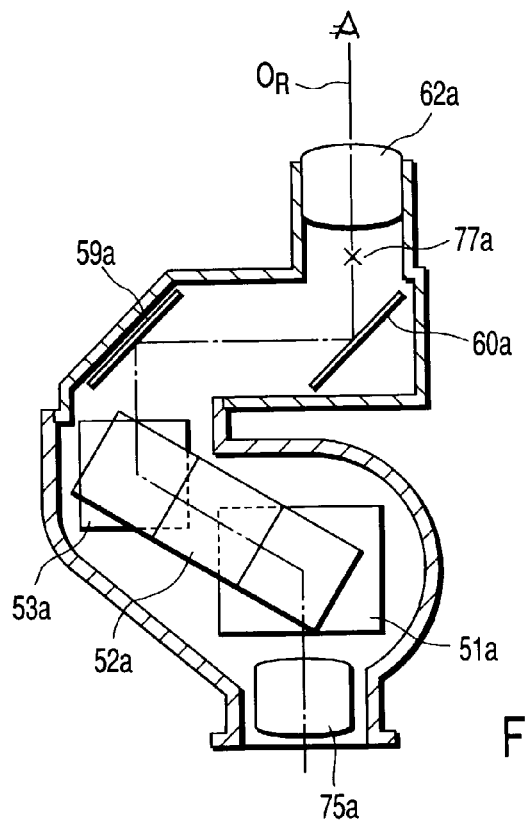
FIG. 8 is a side view of an eyepiece barrel of the mirror unit according to the fourth embodiment of the present invention.

FIGS. 7 and 8 illustrate a mirror unit of a surgical microscope according to a fourth embodiment of the present invention. While the projection lens group and image pickup lens group are provided in the eyepiece barrel in the third embodiment, they are done in the mirror unit in the fourth embodiment. The same components as those of the third embodiment are indicated by the same reference numerals and their descriptions are omitted.

FIG. 7 is a diagram of the optical configuration of a mirror unit 70. FIG. 8 is a side view of an eyepiece barrel 71 of the mirror unit 70, showing the right-side observation optical system of FIG. 7.

Referring to FIG. 7, the mirror unit 70 includes an objective 3 for receiving a beam of light from the affected part 2, a scaling optical system 46 for receiving the beam of light from the objective 3 and scaling an image of the beam of light, and a first image-forming optical system 73 for receiving the beam of light from the scaling optical system 46 and relaying it while being formed into an image at a first image-forming point 72.

A first movable housing 74 is connected to the mirror unit 70 through a connector 48. The housing 74 can freely rotate around the axis $O_1$ of the mirror unit 70. The movable housing 74 includes a pair of third image-forming optical systems 75a and 75b. The third image-forming optical systems 75a and 75b are optically connected to the observation optical system of the mirror unit 70 to receive right and left pencils of light from the mirror unit 70. The axis $O_1$ is one that almost coincides with the center axis of the objective 3 and scaling optical system 46.

In FIG. 7, reference numerals 50a and 50b denote mirrors for reflecting pencils of light 90° outwardly through the third image-forming optical systems 75a and 75b, respectively. Image rotator prisms 51a and 51b are arranged on their respective outgoing optical axes of the mirrors 50a and 50b.

Prisms 52a and 52b and triangular prisms 53a and 53b are arranged behind the image rotator prisms 51a and 51b, respectively. As shown in FIG. 8, mirrors 59a and 80a are arranged in a pupil distance adjusting housing 76a located behind the triangular prism 53a, and a second image-forming point 77a at which an image is formed by the third image-forming system 75a, is located behind the housing 76a. In the left-side observation optical system, mirrors 59b and 60b are arranged in a pupil distance adjusting housing 76b located behind the triangular prism 53b, and a second image-forming point 77b at which an image is formed by the third image-forming system 75b, is located behind the housing 76b.

The finally formed images are guided to a pair of eyepiece optical systems 62a and 62b included in eyepiece housings 44a and 44b to form observation optical axes OR and OL as microscopic optical observation images, respectively.

Each of the pupil distance adjusting housings 76a and 76b can freely rotate around an axis that is almost equal to its corresponding one of the outgoing optical axes (in the length direction of FIG. 7) of the triangular prisms 53a and 53b with respect to a second movable housing 78. As in the third embodiment, the housings 76a and 76b constitute a siedentops pupil distance adjusting mechanism.

As illustrated in FIG. 7, a prism 10a serving as a projection means is provided close to the first image-forming point 72a such that its top surface is almost flush with the point 72a. The prism 10a constitutes a projection lens group 13a together with a second image-forming optical system 12a and an LCD monitor 11a.

A beam splitter 14a is provided in a parallel pencil light section between the first image-forming optical system 73 and the third image-forming optical systems 75a and 75b, and the beam splitter 14a, and CCD 15a and image-forming lens 16a constitute an image pickup lens group 17a.

An operation of the surgical microscope according to the fourth embodiment of the present invention will now be described.

Like in the third embodiment, an operator positions the mirror unit 70, adjusts the angle of rotation around each of the axes $O_1$ and $O_2$, and adjusts a pupil distance using the pupil distance adjusting housings 76a and 76b.

The light emitted from the affected part 2 enters the scaling optical system 46 through the objective 3 in the mirror unit 70. The light is scaled to an arbitrary magnification and enters the first image-forming optical system 73. The first image-forming optical system 73 relays pencils of light while forming them into images at the first image-forming point 72. The pencils of light enter the third image-forming optical systems 75a and 75b.

The right and left pencils of light pass through the image rotary prisms 51a and 51b and their image rotations are corrected by the rotation of the second movable housing 78 around the axis $O_2$. After that, the light pencils are reflected by the prisms 52a and 52b, triangular prisms 53a and 53b, mirrors 59a and 59b, and mirrors 60a and 80b and formed again into images at the first image points 77a and 77b. Then, the images are guided to the eyepiece optical systems 62a and 62b and observed three-dimensionally at a desired magnification by the operator.

The operator operates a control unit (not shown) to display a desired image on the LCD monitor 11a together with an endoscopic observation image and a microscopic image such as CT and MR images. Then, the light emitted from the LCD monitor 11a is formed into an image on the top surface of the prism 10a by the second image-forming optical system 12a. The top surface of the prism 10a is located close to the first image-forming point 72. The endoscopic observation image is superposed on the microscopic image and the superposed image is displayed on the top surface of the prism 10a.

The parallel light pencils incident on the beam splitter 14a are split between the image pickup lens group 17a and the third image-forming optical systems 75a and 75b. The light pencil on the image pickup lens group 17a is formed into an image on the CCD 15a by the image-forming lens 16a. The image formed on the CCD 15a is converted into an electrical signal. The electrical signal is transmitted to a CCU (not shown) and restored to a video signal. The video signal is displayed on a monitor (not shown) or recorded on a VTR (not shown).

Consequently, the fourth embodiment has the following advantage in addition to that of the third embodiment. The eyepiece barrel can be downsized further because both the projection optical system and image pickup optical system are provided not in the eyepiece barrel but in the mirror unit. Further, only one image projection means is sufficient since it is provided for a beam of light that has not yet been split into right and left pencils of light.

Figure 10:
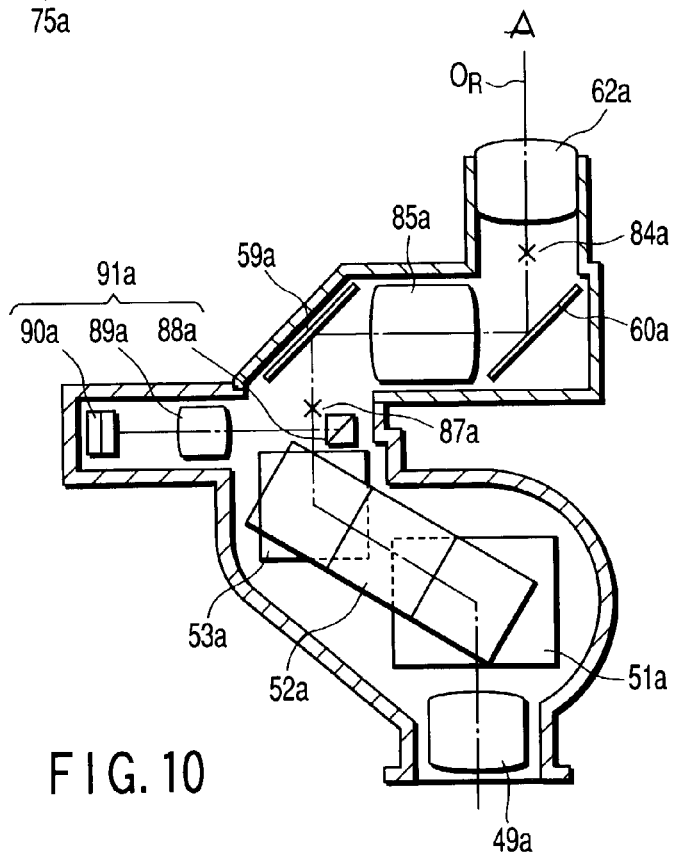
FIG. 10 is a side view of an eyepiece barrel of the mirror unit according to the fifth embodiment of the present invention.
Figure 9:
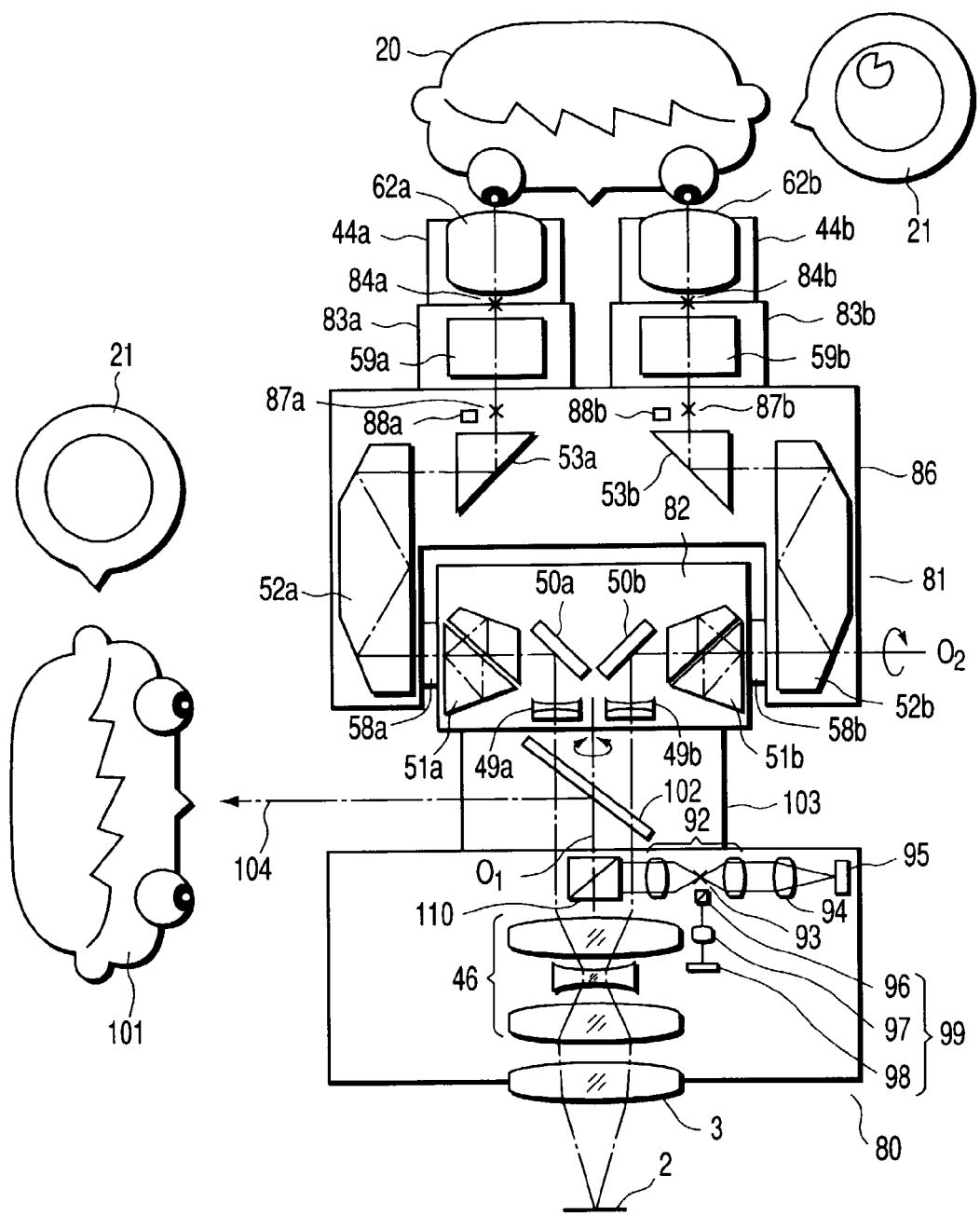
FIG. 9 is a diagram of the configuration of a mirror unit of a surgical microscope according to a fifth embodiment of the present invention.

FIGS. 9 and 10 illustrate a mirror unit of a surgical microscope according to a fifth embodiment of the present invention. In the fifth embodiment, a half mirror for guiding a beam of light is added to an assistant other than an operator. FIG. 9 is a diagram of the optical configuration of a mirror unit 80. FIG. 10 is a side view of an eyepiece barrel 81 of the mirror unit 70, showing the right-side observation optical system of FIG. 9.

Referring to FIG. 9, the mirror unit 80 includes an objective 3 for receiving a beam of light from the affected part 2 and a scaling optical system 46 for receiving the beam of light from the objective 3 and scaling an image of the beam of light. First image-forming optical systems 49a and 49b and a beam splitter 110 are arranged behind the scaling optical system 46. A half mirror 102 is provided for splitting the beam of light between an operator 20 and an assistant 101. The half mirror 102 is included in a connector 103.

A first movable housing 82 is connected to the mirror unit 80 through the connector 103. The housing 82 can freely rotate around the axis $O_1$ of the mirror unit 80. The first movable housing 82 includes a pair of first image-forming optical systems 49a and 49b. The first image-forming optical systems 49a and 49b are optically connected to the observation optical system of the mirror unit 80 to receive right and left pencils of light from the mirror unit 80. The axis $O_1$ is one that almost coincides with the center axis of the objective 3 and scaling optical system 46.

Mirrors 50a and 50b are arranged behind the first image-forming optical systems 49a and 49b to reflect pencils of light 90° outwardly through the first image-forming optical systems 49a and 49b, respectively. Image rotator prisms 51a and 51b are arranged on their respective outgoing optical axes of the mirrors 50a and 50b.

Prisms 52a and 52b and triangular prisms 53a and 53b are fixedly arranged behind the image rotator prisms 51a and 51b, respectively. First image points 87a and 87b at which images are formed by the first image-forming optical systems 49a and 49b are located behind the triangular prisms 53a and 53b, respectively.

As illustrated in FIG. 10, a pupil distance adjusting housing 83a located behind the first image-forming point 87a includes mirrors 59a and 60a. A relay lens 85a is provided between the mirrors 59a and 60a as a third image-forming optical system for forming a beam of light at a second image-forming point 84a. In the left-side observation optical system, a pupil distance adjusting housing 83b located behind the first image-forming point 87b includes mirrors 59b and 60b. A relay lens 85b is provided between the mirrors 59b and 60b as a third image-forming optical system for forming a beam of light at a second image-forming point 84b.

The finally-formed images are guided to a pair of eyepiece optical systems 62a and 62b included in eyepiece housings 44a and 44b to form observation optical axes OR and OL as microscopic optical observation images, respectively.

Each of the pupil distance adjusting housings 83a and 83b can freely rotate around an axis that is almost equal to its corresponding one of the outgoing optical axes (in the length direction of FIG. 9) of the triangular prisms 53a and 53b with respect to a second movable housing 88. As in the third embodiment, the housings 83a and 83b constitute a siedentops pupil distance adjusting mechanism.

In FIG. 10, a prism 88a serving as a second projection means is provided close to the first image-forming point 87a such that its top surface is almost flush with the point 87a. The prism 88a constitutes a projection optical system 91a together with a second image-forming optical system 89a and an LCD monitor 90a. The projection optical system 91a is placed on a mobile unit like the slide table 33a in the second embodiment and can move and retreat into a beam of light by operating the controller.

A second image-forming optical system 92 is located in an optical path of the other beam of light split by the beam splitter 110 in the mirror unit 80. The system 92 relays the beam of light while forming it into an image at a third image-forming point 93. An image-forming lens 94 and a CCD 95 are arranged behind the third image-forming point 93.

A prism 96 is provided close to the third image-forming point 93 such that its top surface is almost flush with the point 93. The prism 96, second image-forming optical system 97, which serves as an image-transmitting optical system, and LCD monitor 98 constitute a display lens group 99. The display lens group 99 is fixed on a slide table (not shown) and moves and retreats in synchronization with an operation of the projection optical system 91a. In FIG. 9, reference numeral 104 indicates a beam of light split by the half mirror 102 and extending to the assistant side. This beam of light reaches the assistant's eyes through an eyepiece barrel (not shown) as in the case of the operator 20. However, a projection optical system in the assistant's eyepiece barrel moves independently unlike the projection optical systems 91a and 91b in the operator's eyepiece barrel and the display lens group 99 in the mirror unit 80.

An operation of the surgical microscope according to the fifth embodiment of the present invention will now be described.

Like in the third embodiment, an operator positions the mirror unit 80, adjusts the angle of rotation around each of the axes $O_1$ and $O_2$ and adjusts a pupil distance using the pupil distance adjusting housings 83a and 83b.

The light emitted from the affected part 2 enters the scaling optical system 46 through the objective 3 in the mirror unit 80. The light is scaled to an arbitrary magnification and enters the beam splitter 110.

The beam of light incident upon the beam splitter 110 is split between the half mirror 102 and the third image-forming optical system 92. The beam of light incident upon the half mirror 102 is split again between the first image-forming optical systems 49a and 49b and the assistant 101.

The pencils of light incident upon the first image-forming optical systems 49a and 49b pass through the image rotary prisms 51a and 51b and their image rotations are corrected by the rotation of the second movable housing 86 around the axis $O_2$. After that, the light pencils are reflected by the prisms 52a and 52b and triangular prisms 53a and 53b and formed into images at the first image points 87a and 87b.

Thereafter, the pencils of light are reflected by the mirrors 59a and 59b and mirrors 60a and 60b and formed again into images at the second image points 84a and 84b by the relay lenses 85a and 85b each arranged between the mirrors. Then, the images are guided to the eyepiece optical systems 62a and 62b and observed three-dimensionally at a desired magnification by the operator.

If the operator operates a control unit in order to display a desired image together with a microscopic image, the same image is displayed on the LCD monitors 90a, 90b and 98. Then, the light emitted from the LCD monitors 90a and 90b is formed into images on the top surfaces of the prisms 88a and 88b by the second image-forming optical systems 89a and 89b. An endoscopic observation image is therefore superposed on the microscopic image and the superposed image is displayed in the vicinity of each of the first image points 87a and 87b. The operator thus observes a superposed image formed again at each of the second image points 84a and 84b.

On the other hand, the parallel pencils of light incident upon the beam splitter 110 are formed into an image at the third image-forming point 93 by the third image-forming optical system 92. The light emitted from the LCD monitor 98 is formed into an image on the top surface of the prism 96 by the second image-forming optical system 97. An endoscopic observation image is therefore superposed on the microscopic image and the superposed image is displayed near the third image-forming point 93. This image is formed on the CCD 95 by the image-forming lens 94. After that, the image is displayed on the monitor or recorded on a VTR as in the third embodiment.

If the operator 20 need not observe an LCD monitor image but wishes to observe only the affected part 2, he or she operates a controller (not shown) to retreat the projection optical system 91 from the observation beam of light. Thus, the display lens group 99 in the mirror unit 80 also retreats in synchronization with the projection optical system 91. It is therefore only the image of the part 2 that is displayed on the monitor or recorded on the VTR.

On the other hand, the assistant 101 can cause the projection means to retreat while the operator 20 is observing an LCD monitor image.

In addition to the advantage of the third embodiment, the fifth embodiment has the advantage that the eyepiece barrel can be downsized further because only the projection means is provided in the eyepiece barrel.

The eyepiece barrel of the fifth embodiment cannot be downsized more than that of the fourth embodiment. However, each of the operator and assistant can choose one between display and non-display of a child screen. (In the fourth embodiment, the display/non-display states of the child screens of the operator and assistant are the same.)

According to the fifth embodiment, the prisms are arranged as projection means and the LCD monitors are arranged as display means. Even though a common display image is transmitted to the projection means from a common LCD monitor, the same advantage can be obtained. The decrease in the number of LCD monitors allows the microscope to be manufactured at low cost.

FIG. 11 shows a mirror unit of a surgical microscope according to a sixth embodiment of the present invention. The sixth embodiment differs from the first embodiment in that the first image-forming optical system is deleted. The same components as those of the first embodiment are denoted by the same reference numerals and their descriptions are omitted.

A half mirror 100a is provided between a scaling optical system 4a and a third image-forming optical system 8a. A second image-forming optical system 12a and an LCD monitor 11a for displaying an electronic image sent from a navigation system or the like are arranged behind the half mirror 100a. The affected part 2, which serves as an object plane, and the LCD monitor 11a are located in a conjugate relationship with the second image-forming point 7a.

An operation of the surgical microscope according to the sixth embodiment of the present invention will now be described.

The light emitted from the part 2 enters the scaling optical systems 4a and 4b through an objective 3 of the mirror unit 1. The light is scaled to an arbitrary magnification and then formed into images of the part 2 at the second image points 7a and 7b by the third image-forming optical systems 8a and 8b.

When a pre-operative image from a navigation system (not shown) is displayed on the LCD monitor ha through a control unit, it is projected into a beam of light in an observation system through the second image-forming optical system 12a by the half mirror 100a. Then, the image is formed at the second image-forming point 7a. At the second image-forming point 7a, the image of the part 2 and the display image of the LCD monitor 11a are superposed one on another. If the pre-operative image is superposed on an image of the part under operation, the operator can know a portion to be cut. The superposed image can be recorded on a VTR. In the sixth embodiment, an image is projected only on the right eye of the operator; however, it can be projected on both eyes thereof.

According to the sixth embodiment, not only a partial image is projected but also an image is projected on the entire observation screen. The operator can thus know a portion to be cut during the operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
   an objective;
   a first image-forming optical system arranged to receive a beam of light from said objective, to form the beam of light from the objective into a first optical image at a first image-forming point and to relay the first optical image along a first optical path;
   an image source which provides a second image not derived from the light from the objective;
   a second image-forming optical system which cooperates with the image source to form a second optical image from the second image at a second image-forming point near the first image-forming point, the first image forming optical system relaying a light beam corresponding to a composite of the first and second optical images along the first optical path;
   a third image-forming optical system arranged on the first optical path to receive the composite light beam, to form a third optical image from the composite light beam at a third image-forming point, and to guide the third optical image to an eyepiece lens;
   a beam splitter arranged along the first optical path between the first image-forming point and the third image-forming point which is operable to split the composite light beam between the first optical path and a second optical path;

a fourth image-forming optical system arranged on the second optical path which forms a fourth optical image from the portion of the composite light beam on the second optical path;

an image pickup element arranged on the second optical path which receives the fourth optical image for conversion to an electronic display on a monitor, and a memory for receiving electric signals from said image pickup element, said memory storing the fourth optical image.

2. The microscope apparatus according to claim 1, wherein said first image-forming optical system, said second image-forming optical system, and said third image-forming optical system are provided closer to said objective than the third image-forming point.

3. The microscope apparatus according to claim 1, wherein said beam splitter guides said composite light beam to said image pickup element, and said first image-forming point is located closer to said objective than said beam splitter.

4. The microscope apparatus according to claim 1, wherein:
said objective includes a pair of right and left objectives;
said first image-forming optical system includes a pair of right and left first image-forming optical systems; and
a scaling optical system is provided between said objective and said first image-forming optical system.

5. The microscope apparatus according to claim 1, wherein said first image-forming optical system, said second image-forming optical system, and said third image-forming optical system each include a pair of right and left image-forming optical systems corresponding to a pair of eyepiece lenses.

6. The microscope apparatus according to claim 1, wherein said second image-forming optical system is comprised of an image-displaying section connected to the image source, a prism, and an image-forming lens which is arranged on an outgoing optical axis of the image-displaying section to form an image of the image-displaying section on the prism.

7. The microscope apparatus according to claim 1, wherein said fourth optical image is formed by superposition of said first optical image and said second optical image.

8. The microscope apparatus according to claim 7, further comprising a monitor for receiving electric signals from said image pickup element, which displays said fourth optical image.

9. The microscope apparatus according to claim 8, wherein the memory is electrically connected to said image pickup element.

10. The microscope apparatus according to claim 9, further comprising a monitor electrically connected to said memory, which displays said fourth optical image stored in said memory.

11. The microscope apparatus according to claim 1, wherein the second image-forming point is located in a conjugate relationship with said fourth image-forming optical system.

12. The microscope apparatus according to claim 1, wherein said beam splitter is selectably movable into and out of the first optical path.

13. The microscope apparatus according to claim 1, wherein said objective and said first image-forming optical system are rotatable around an optical axis.

14. The microscope apparatus according to claim 1, wherein said eyepiece lens is provided in a pair of rotatable pupil distance adjusting housings.

15. The microscope apparatus according to claim 1, wherein the memory is electrically connected to said image pickup element.

16. The microscope apparatus according to claim 15, further comprising a monitor electrically connected to said memory, which displays said fourth optical image stored in said memory.

17. A microscope apparatus comprising:
an objective;
a first image-forming optical system arranged to receive a beam of light from said objective, said first image-forming optical system being operative to form the beam of light from said objective into a first optical image at a first image-forming point and to relay the first optical image along a first optical path;
a signal source which provides a signal representing a second image not derived from the light from the objective;
a second image-forming optical system which cooperates with the signal source to form a second optical image from the second image signal at a second image-forming point on a plane which is perpendicular to the first optical axis and includes the first image-forming point whereby a light beam corresponding to a composite of the first and second optical images is relayed by said first image-forming optical system along the first optical path;
a third image-forming optical system arranged on the first optical path to receive the composite light beam, to form a third optical image from the composite light beam at an associated image-forming point, and to guide the third optical image to an eyepiece lens;
a beam splitter arranged along the first optical path between the first image-forming point and the image-forming point associated with the third image-forming optical system which is operable to split the composite light beam between the first optical path and a second optical path; and
a fourth image-forming optical system arranged on the second optical path which forms a fourth optical image from the portion of said composite light beam on the second optical path;
an image pickup element arranged on the second optical path to receive the fourth optical image for conversion to an electric signal, and
a memory for receiving electric signals from said image pickup element, said memory storing the fourth optical image.

18. The microscope apparatus according to claim 17, wherein said fourth optical image is formed by superposition of said first optical image and said second optical image.

19. The microscope apparatus according to claim 18, further comprising a monitor electrically connected to said image pickup element, which displays said fourth optical image.

20. The microscope apparatus according to claim 18, wherein the memory is electrically connected to said image pickup element.

21. The microscope apparatus according to claim 17, wherein said beam splitter guides said composite light beam to said image pickup element, and said first image-forming point is located closer to said objective than said beam splitter.

22. The microscope apparatus according to claim 17, wherein the second image-forming point is located in a conjugate relationship with said fourth image-forming optical system.

23. A microscope apparatus comprising:

an observation optical system which receives light from an objective, forms the light into an optical image at each of a first image-forming point and a second image-forming point, and transmits the optical image to an eyepiece optical system from the second image-forming point;

display means for displaying an image derived from a source other than the objective;

optical image superposing means element for optically superposing the image displayed on said display means on the optical image near the first image-forming point of said observation optical system to form a composite image for transmission to the second image-forming point;

optical image splitting means for optically splitting off a portion of the composite image transmitted through an optical path between the first image-forming point and the second image-forming point; and an electronic image pickup for picking up the optical image split off by said optical image splitting means.

24. The microscope apparatus according to claim 23, wherein said optical image superposing means is operative to form the composite image on a plane which is perpendicular to an optical axis of the first image-forming point and includes the first image-forming point.

25. The microscope apparatus according to claim 23, wherein said optical image splitting means is selectively movable into and out of an optical path of said observation optical system.

26. The microscope apparatus according to claim 24, wherein the portion of said composite image corresponding to the image displayed on said display means is formed on said perpendicular plane at a location displaced from the first image-forming point.

* * * * *